CHARACTER RECOGNITION

Jan. 11, 1966 T. REUMERMAN ET AL 3,229,252

CHARACTER RECOGNITION

Filed Nov. 1, 1961 2 Sheets-Sheet 2

3,229,252
CHARACTER RECOGNITION

Theodorus Reumerman, 12 Zandvoortselaan, Zandvoort, Netherlands, and Willem Hendrik Theodorus Helmig, 9 Van Slingelandtlaan, Leiden, Netherlands Filed Nov. 1, 1961, Ser. No. 149,327
7 Claims. (Cl. 340—146.3)

Figure 1:
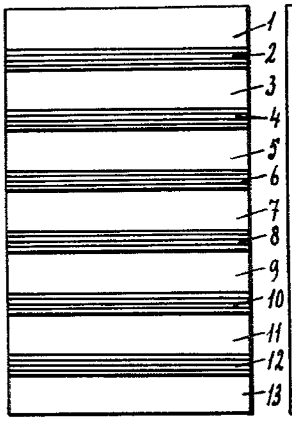

The invention relates to character recognition, and in particular to methods and means for translating characters appearing on a carrier, such as a sheet of paper, a card, a tape, the wheels of a counter, or the like, into electric signals adapted to control a machine in which the information represented by the characters is to be processed.

Character recognition is a procedure whereby visually readable characters, such as letters or digits, appearing on a document or on any other suitable carrier, are identified and entered into a processing machine without any human intervention. For this purpose, the characters are translated into electric signals, which are supplied to the processing machine. Of course, the signals may be stored in a tape or in any other suitable memory device and supplied to the machine at a later time. Also, the machine may be remote from the recognition means, so that the signals have to be supplied to the machine through a line or a radio link. The signals are generally obtained by scanning each character with the aid of a scanning device yielding an electric output signal, and by interpreting the scanning results so as to identify the character. The scanning device may be of any desired nature; for instance, use may be made of a photo-electric scanning device, comprising a light source and a photocell, an electromagnetic scanning device of the kind used in tape recording, or an electric scanning device comprising two spaced contact brushes. Of course, the characters must be adapted to the scanning method, i.e. they must be clearly distinguishable from their background in the case of photo-electric scanning, printed with a magnetizable ink in the case of electromagnetic scanning, and printed with a conductive ink in the case of electric scanning.

In principle, it is possible to recognize conventional characters "as they are," i.e. without any modification of their shape. However, this renders the interpretation of the scanning results very difficult, so that complicated identification circuits are required. For this reason, it is generally preferred to introduce suitable modifications in the shape of the characters in order to facilitate the interpretation of the scanning results. For instance, the lines of the characters may be interrupted in one or more predetermined zones, the diameter of the lines may be increased in one or more predetermined zones, or the characters may be provided with projections in one or more predetermined zones whereby their height or width is locally increased. By all these modifications, certain "markings" are introduced in the characters, which may be easily recognized in the output signal of the scanning device.

Another method of "marking" the characters is to print them with a magnetizable ink, and to magnetize the ink only in one or more predetermined zones, so that each character comprises magnetized and non-magnetized parts which may be distinguished from each other by electromagnetic scanning means. Also, the characters may be provided, in one or more predetermined zones, with radioactive spots, detectable with the aid of a Geiger-Müller counter or the like.

In all these cases, the markings are generally confined to a few predetermined zones of the characters, and they are distributed over these zones according to a suitable code, such as a binary code, or a "p out of n" code. The result is that the output of the scanning device comprises a code signal identifying the character, which may be separated from the remaining background signal by suitable amplitude filtering or integrating means so as to obtain a signal representing the identity of the character, which may be supplied to an adjacent or remote processing machine either directly or through suitable storing and/or code converting means. Thus, the characters may be considered to be "coded," and the predetermined zones in which the markings appear may be indicated as "coding zones." The remaining parts of the characters, in which no markings ought to occur, will be indicated hereinafter as the "interspace zones."

Each of the above-described marking methods has its particular advantages and disadvantages. The use of local magnetizations or of radio-active spots has the advantage that the visual reading of the characters is not impaired in any way, but it has the disadvantages that the markings are apt to deteriorate in the course of time, and that a very complicated mechanism is required for producing the characters. Characters of modified shape are easy to produce, as they may be printed by means of any existing mechanism in which new types have been inserted. On the other hand, a modification of the shape tends to make the visual reading of the characters more difficult. We have found, however, that characters that have been coded by interruptions in the lines of each character are very easy to read, so that the visual readability is practically not impaired by the markings. For this reason, our preferred marking system comprises the use of linear interruptions extending through the entire characters, as disclosed in our application Serial No. 626,538, and our present invention will be described hereinafter with reference to this preferred marking system. It is to be understood, however, that the invention is not restricted to this marking system, but may be used to the same advantage with any other marking system.

Up to now, it has been the general belief that the only information required for a reliable recognition of the characters is a signal representing the contents of the coding zones. Thus, in some of the prior character recognition systems, the scanning of the characters has been strictly confined to the coding zones. In other systems, the characters were scanned in their entirety, for instance by means of a line scanning method of the kind as used in television, but only the part of the output signal representing the contents of the coding zones was registered and subjected to interpretation. Information about the contents of the interspace zones was either not available, or was deliberately left out of consideration.

We have found that such prior methods, in which the recognition of the characters is exclusively based on the contents of the coding zones, are unreliable, as they may lead to a misinterpretation in the case of slight imperfections of the characters due to faulty printing, and/or in the case of a misalignment of the characters with respect to the scanning device, so that the reliability of the recognition may be considerably increased by registering separate information about the contents of the coding zones and the interspace zones, and by comparing this information during the interpretation of the scanning results.

Thus, it is an object of the invention to improve the reliability of character recognition systems making use of coded characters.

Another object of the invention is to provide apparatus for scanning and analyzing coded characters wherein the scanning of each character is extended through the entire surface thereof, and wherein information about the contents of the coding zones and the interspace zones is separately registered.

Still another object of the invention is to provide apparatus of the above-mentioned kind wherein a character is rejected in case of a misalignment.

A further object of the invention is to provide apparatus for scanning and analyzing coded characters wherein the entire surface of each character is scanned, and which allows for a certain misalignment of the character.

According to the invention, the scanning of each character is extended through its entire surface, and the scanning device cooperates with at least two separate registers in such manner that at least one register collects information about the contents of the coding zones, and at least one other register collects information about the contents of the interspace zones.

The invention may be carried out by means of a scanning device which is relatively displaceable with respect to the character carrier in the general direction of the coding zones, and which comprises at least two interleaved groups of scanning elements, together covering at least the entire dimension of the character perpendicular to the direction of said relative displacement, and each cooperating with a separate register.

After a character has been scanned, at least one of the registers will contain a coded signal identifying the character, and at least one other register will contain a non-coded signal representing the contents of the interspace zones. The coincidence of these two conditions is used as a criterion for the validity of the scanning results. If the criterion is satisfied, the coded signal is supplied to the processing machine; if the criterion is not satisfied, the carrier is rejected.

When only two groups of scanning elements are used, a misalignment of the characters with respect to the scanning device may lead to an unnecessary rejection of the carrier due to the fact that each of the registers contains an uncoded signal. This disadvantage may be removed by the use of a scanning device comprising at least three interleaved groups of scanning elements, together covering the entire dimension of the character perpendicular to said relative displacement and extending through a distance larger than said dimension, and by making the dimension of each coding zone perpendicular to said relative displacement at least equal to twice the dimension of a scanning element in the same direction. In this case, there is a certainty that a properly printed character will produce a valid coded signal in at least one of the registers, even in case of a misalignment within the limits defined by the construction of the scanning device.

Figure 2:
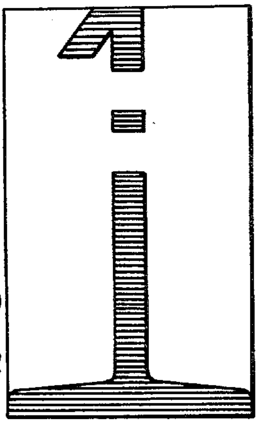
Figure 3:
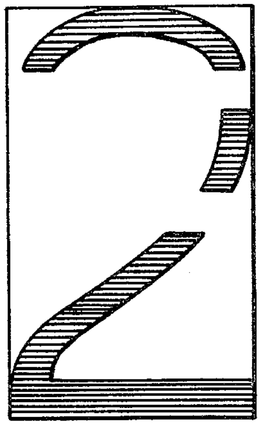
Figure 4:
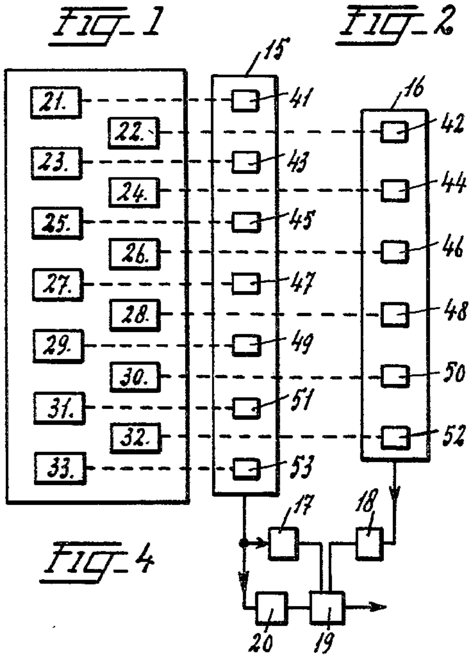
Figure 6:
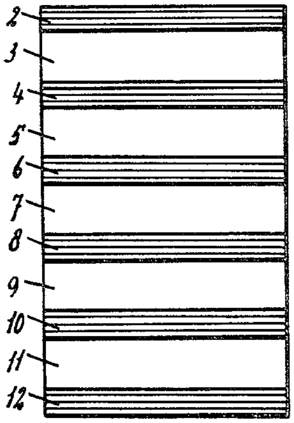
Figure 5:
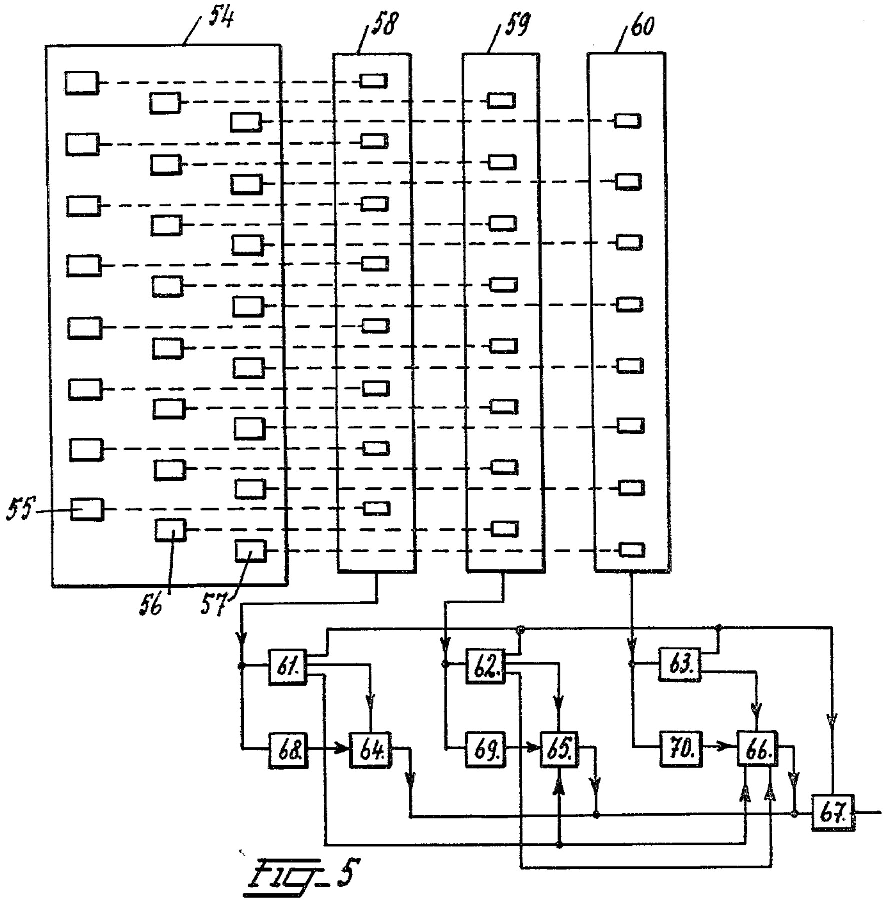

For a further explanation of the nature of our invention reference is made to the accompanying drawings, in which:

FIG. 1 is a diagram showing the division of a character field in a plurality of horizontal zones;

FIGS. 2 and 3 show, by way of example, how the digits 1 and 2 may be represented in the character field of FIG. 1;

FIG. 4 schematically shows a scanning head and two associated registers, embodying the general principle of the invention;

FIG. 5 schematically shows a scanning head with three associated registers, allowing for a misalignment of the characters with respect to the scanning head;

FIG. 6 illustrates an alternative method of dividing the character field in a plurality of zones.

The character field shown in FIG. 1 is divided in thirteen horizontal zones 1–13. The odd-numbered zones 1, 3, 5, 7, 9, 11 and 13 are the coding zones, the even-numbered zones 2, 4, 6, 8, 10 and 12 the interspace zones. The marking of the characters occurs by interruptions in zones 3, 5, 7, 9 and 11; no interruptions occur in zones 1 and 13, which serve to check the alignment of the character. The height of the odd-numbered coding zones is about twice the height of the even-numbered interspace zones. Although horizontal zones have been shown for purposes of explanation, it will be understood that the invention is also applicable to a system making use of vertical coding zones.

The characters to be recognized are assumed to be the digits from 1 to 0, of which the identity is indicated by interruptions according to a "two out of five" code. This code may be, for instance, as follows:

| Digits | Interruptions in zones |
|---|---|
| 1 | **3** and **5** |
| 2 | **3** and **7** |
| 3 | **3** and **9** |
| 4 | **3** and **11** |
| 5 | **5** and **7** |
| 6 | **5** and **9** |
| 7 | **5** and **11** |
| 8 | **7** and **9** |
| 9 | **7** and **11** |
| 0 | **9** and **11** |

Other codes may also be used, for instance a three out of six or three out of seven code. The three out of seven code enables the recognition of 35 different characters. It is to be understood, however, that the use of a p out of n code, although it has certain advantages, is not essential for the invention; useful results may also be obtained with the aid of other codes, such as a binary code.

FIG. 2 shows a digit 1 in which interruptions are provided in zones 3 and 5, according to the above-specified code.

FIG. 3 shows a digit 2 with interruptions in zones 3 and 7. It will now be clear how the remaining digits are to be coded.

It is pointed out that the digits fit in the character field of FIG. 1, i.e. that the height of each digit is exactly equal to the height of the character field.

For purposes of explanation, it is further assumed that the characters are printed on a document with the aid of a magnetizable ink, and that they are magnetized before the scanning operation.

The scanning head shown in FIG. 4 and generally indicated by the reference number 14, comprises thirteen elements 21–33, associated with zones 1–13 of the character field. Each of these scanning elements is constituted by the air gap of an electromagnetic reading head of the kind used in magnetic memory devices; the coil wound on the magnetic core of each reading head is connected with an associated register element 41–53 through a suitable amplifier (not shown).

The scanning elements are divided in two groups, one consisting of the odd-numbered scanning elements, and the other of the even-numbered scanning elements. These two groups are interleaved, i.e. each scanning element of the even-numbered group fits between two adjacent scanning elements of the odd-numbered group, and together they cover the entire height of the character.

The register elements are likewise divided in two groups; the odd-numbered register elements associated with the odd-numbered scanning elements constitute a first register 15, and the even-numbered register elements associated with the even-numbered scanning elements constitute a second register 16. Each of the register elements has two stable positions, and may be brought from one of these positions into the other one by means of an electric impulse; for instance, the register elements may be formed as flip-flop circuits, or as ferrite rings.

The document bearing the characters is moved from left to right past the scanning head 14. As soon as a part of the character moves past one of the scanning elements, an impulse is generated, which is supplied to the associated register element, whereby the latter is brought from its neutral or first position into its operative or second position. The register element then remains in its operative position until the scanning of the character has been completed, after which it is returned to its neutral position, for instance by a suitable timing circuit.

When the digit 1 shown in FIG. 2 is moved past the scanning head 14, the odd-numbered register elements 41, 47, 49, 51 and 53 of the first register 15 are brought into the operative position, whereas register elements 43 and 45, corresponding with the interruptions, remain in the neutral position. The even-numbered register elements of the second register, corresponding with the interspace zones, are all brought into the operative position. Likewise, if the digit 2 shown in FIG. 3 is moved past the scanning head, register elements 43 and 47, corresponding with the interruptions in the digit, remain in the neutral position, while all other register elements are brought into the operative position. Thus, it will be understood that the scanning of a properly printed and aligned character brings five of the seven elements of the first register and all the elements of the second register into the operative position. These conditions are checked by means of a first test circuit 17 connected with the first register, and a second test circuit 18 connected with the second register. If both test circuits find the desired condition to exist, they open a gate 19. The first register is then read out by means of a read-out device 20, and the reading is transferred to the processing machine through gate 19.

The alignment of the character is checked by means of scanning elements 21 and 33. If the character is properly aligned, register elements 41 and 53 are both brought into the operative position. If the position of the character is too high, register element 53 remains in the neutral position; if the position of the character is too low, register element 41 remains in the neutral position. In both last-mentioned cases, test circuit 17 generates a reject signal, whereby the character carrier is rejected.

As stated hereinbefore, the scanning elements are assumed to be electromagnetic reading heads; it may further be assumed that the pole pieces are placed to the left and to the right of the scanning element, so that the lines of force run in the direction of the movement of the carrier. This arrangement is not absolutely essential, however; it would also be feasible to have the pole pieces above and below the scanning elements, so that the lines of force would run at right angles with the scanning movement. The scanning elements are shown in a staggered position; this arrangement is very suitable with a view to the required space, and to mutual couplings between the elements.

FIG. 5 shows an embodiment of the invention, which allows for a certain misalignment of the characters with respect to the scanning head. The scanning head 54 comprises three interleaved groups of scanning elements, indicated at 55, 56 and 57. Each of these groups is associated with a separate register 58, 59 or 60, respectively. The distance between the centre lines of adjacent scanning elements of each group is equal to the distance between the centre lines of adjacent coding zones. It will be assumed that a properly aligned character gives a coded signal in the seven lowermost elements of register 58. In this case, six of the elements of each of the registers 59 and 60 are brought into the operative position. If the position of the character is somewhat lower, the coded signal in register 58 vanishes, but register 59 takes over, and now carries the coded signal in its seven lowermost elements. If the position of the character becomes still lower, the coded signal is shifted to the seven lowermost elements of register 60. In a similar manner, the coded signal is shifted from the seven lowermost elements of register 58 to the seven topmost elements of register 59, if the position of the character is somewhat too high. If the position of the character becomes still higher, the coded signal is first shifted to the seven topmost elements of regitser 60, and then to the seven topmost elements of register 58.

In order to ascertain that, upon disappearance of the coded signal in any register, one of the other registers takes over immediately, the height of a coding zone should be at least twice the height of a scanning element. A transient condition may occur, wherein coded signals appear in two registers simultaneously. It will be understood that, for the embodiment as shown, the term coded signal denotes a condition of the register wherein, out of a series of seven consecutive elements, five elements including the two extreme ones, are in the operative condition.

Thus, for any misalignment within the limits imposed by the total height covered by the scanning elements, a coded signal will appear in one or two of the registers, whereas six consecutive elements are brought into the operative position in each of the remaining registers, or in the remaining register respectively.

The allowable misalignment may be increased by adding further scanning and register elements.

Each of the registers 58, 59 and 60 is connected with a test circuit 61, 62 or 63 respectively, and with a read-out device 68, 69 or 70 respectively. The read-out devices are each connected with the processing machine (not shown) through an associated gate 64, 65 or 66 respectively, and through a common gate 67.

If a coded signal appears in register 58, test circuit 61 opens gate 64 and locks gates 65 and 66. If a coded signal appears in register 59, test circuit 62 opens gate 65 and locks gate 66. If a coded signal appears in register 60, test circuit 63 opens gate 66. If any of the three test circuits detects six consecutive elements in the operative position, gate 67 is opened. Thus, if the two conditions (coded signal in at least one register, six consecutive elements in the operative position in at least one other register) are satisfied, the coded signal is supplied to the processing machine through one of the gates 64, 65 and 66, and through the common gate 67. A complementary set of gates (not shown) may be used to generate a reject signal if any one of the two conditions is not satisfied. This reject signal may be used to record an "error" marking on the carrier in the vicinity of the faulty character, so that it is possible to find the non-recognized characters, and to apply the necessary corrections later on. This latter procedure is especially useful when the carrier is a tape. Where separate carriers, such as cards or sheets, are used, the reject signal may also be used to throw the carrier out, in addition to or instead of the application of an error marking.

The arrangement of the test circuits and the read-out devices may be simplified by constructing the registers 58, 59 and 60 as shift registers. This makes it possible to shift the signal in each register until the topmost element is in the operative position, after which the testing and reading operations are performed on the seven topmost elements.

In the embodiment as shown in FIG. 5, the scanning elements are physically arranged in three columns each constituting one of the groups in the sense of the invention. It is not necessary, however, that the physical arrangement of the scanning elements corresponds with the electric grouping. For instance, it would be quite feasible to arrange the elements, although electrically pertaining to three groups, in only two columns.

The operation of the test circuits and the readout devices may be controlled by a suitable timing circuit. However, if the scanning elements are arranged as shown in FIG. 5, it is also possible to make the operation "self timing." For this purpose, the first and third groups of scanning elements are spaced with respect to each other at such a distance in the scanning direction, that the first scanning element has completed its scanning operation at the time when the third group reaches the character. Thus, the first register element to be changed over in the third register may be used to initiate the testing operation for the first register. The testing operation for the second register begins as soon as the testing of the first register has been completed; in the same manner, the testing operation for the third register is initiated by the test circuit of the second register.

The testing may be performed by transferring the contents of each register to a suitable storage, and counting the impulses during the transfer by means of an electronic counter.

An alternative manner for dividing the character field into zones is shown in FIG. 6. The character field of FIG. 6 is divided into only eleven zones and differs from the character field of FIG. 1 by the fact that zones 1 and 13 have been left out. When this division of the character field is used, the appearance of a coded signal in a register is represented by a condition wherein, out of a series of five consecutive elements, three elements are in the operative position. The position of the coding zones in which the interruptions occur may now be derived from the position of the six consecutive elements being in the operative position in at least one other register.

Although the invention has been described hereinbefore by reference to some specific examples, it is to be understood that the invention is not restricted to these examples, which may be modified in various ways within the scope of the invention as set forth in the appended claims.

We claim:

1. Apparatus for recognizing visually readable coded characters pertaining to a series wherein each character fits into a character field having alternate coding zones and interspace zones, and wherein the characters are identified by the preselected arrangement of markings and interruptions, the latter being confined to the said coding zones, comprising scanning means adapted to scan the entire surface of each character for separately detecting the markings and interruptions thereof associated with said zones, at least one register controlled by the said scanning means for collecting information related to the contents of the said coding zones, at least one other register controlled by the scanning means for collecting information about the contents of the said interspace zones, and means for analyzing the scanning results by comparison of the information stored in the said registers.

2. Apparatus for recognizing visually readable coded characters appearing on a carrier and pertaining to a series wherein each character fits into a character field having alternate coding zones and interspace zones, and wherein the characters are each constituted by separate arrangements of markings and interruptions and wherein the latter are confined to the said coding zones, said apparatus comprising a scanning device relatively displaceable with respect to said character carrier in the direction of the said coding zones, at least two interleaved groups of scanning elements in said scanning device, each group being associated with a respective one of said zones and together said groups covering at least the entire dimension of the character perpendicular to the direction of said relative displacement, a plurality of registers each controlled by one of the said groups of scanning elements, and means for analyzing the scanning results by comparison of the information stored in the said registers.

3. Apparatus as claimed in claim 2, wherein the said analyzing means responds to the coincidence of a coded signal identifying the character in at least one of the said registers, and of a signal representing the contents of the said interspace zones in at least one other of the said registers.

4. Apparatus as claimed in claim 3, further comprising gating means controlled by the said analyzing means and authorizing the read-out of the said coded signal upon occurrence of said coincidence.

5. Apparatus for recognizing visually readable coded characters appearing on a carrier and pertaining to a series wherein each character fits into a character field having alternate coding zones and interspace zones, and wherein the characters are each constituted by separate arrangements of markings and interruptions and wherein the latter are confined to the said coding zones, comprising a scanning device relatively displaceable with respect to said character carrier in the direction of the said coding zones, at least three interleaved groups of scanning elements in said scanning device, each group being associated with one of said zones and together said group covering the entire dimension of the character perpendicular to the direction of said relative displacement and extending through a distance larger than said dimension, the dimension of each coding zone in the direction perpendicular to said relative displacement being equal to at least twice the dimension of a scanning element in said direction, a plurality of registers each controlled by one of the said groups of scanning elements, and means for analyzing the scanning results by comparison of the information stored in the said registers.

6. Apparatus as claimed in claim 5, wherein the said analyzing means comprise a plurality of test circuits each associated with one of the said registers, a plurality of gating elements each controlled by one of the said test circuits so as to be opened when the associated register contains a coded signal identifying the character, a common gating element adapted to be controlled by each of the said test circuits so as to be opened when one of the said registers contains a non-coded signal representing the contents of the said interspace zones, and means for reading out any one of the said registers through one of the said first-mentioned gating elements and said common gating element.

7. Apparatus as claimed in claim 5, wherein each of the said scanning elements consists of an electromagnetic reading head.

References Cited by the Examiner

UNITED STATES PATENTS

| | | | |
|---|---|---|---|
| 2,784,392 | 3/1957 | Chaimowicz | 235—61.12 |
| 2,942,237 | 6/1960 | Quiogue | 340—146.3 |
| 2,978,675 | 4/1961 | Highleyman | 340—146.3 |

MALCOLM A. MORRISON, *Primary Examiner.*

DARYL W. COOK, *Examiner.*